United States Patent [19]
Gentle et al.

[11] Patent Number: 5,169,561
[45] Date of Patent: Dec. 8, 1992

[54] ANTIMICROBIAL ANTIFOAM COMPOSITIONS AND METHODS

[75] Inventors: Thomas M. Gentle, Sanford; William C. White, Midland, both of Mich.

[73] Assignee: Dow Corning Corporation, Midland, Mich.

[21] Appl. No.: 681,581

[22] Filed: Apr. 8, 1991

Related U.S. Application Data

[60] Division of Ser. No. 378,563, Jul. 7, 1989, Pat. No. 5,073,298, which is a continuation-in-part of Ser. No. 221,581, Jul. 20, 1988, abandoned.

[51] Int. Cl.$^5$ .................. B01J 19/04; C09K 3/00
[52] U.S. Cl. ............................. 252/321; 252/358; 514/642; 514/643; 523/122
[58] Field of Search ............... 252/321, 358; 514/642, 514/643; 523/122

[56] References Cited
U.S. PATENT DOCUMENTS 4,395,352  7/1983  Kulkarni et al. ................... 252/321

Primary Examiner—Marianne M. Cintins
Assistant Examiner—Catherine Scalzo
Attorney, Agent, or Firm—Jim L. DeCesare

[57] ABSTRACT

A defoamer composition including a primary antifoam agent which includes a particulate-type material having a high surface area such as silica, a secondary antifoam agent for acting synergistically with the primary antifoam agent such as polydimethylsiloxane, a water carrier, and a quaternary ammonium salt silane compound which functions as an antimicrobial agent, fixed and adhered to the surface of the particulate material, in order that the defoamer composition be resistant to biological degradation due to the presence in the system of microorganisms. Methods of defoaming cationic, anionic, and nonionic surfactant produced foams are disclosed, as is a method of rendering silica hydrophobic.

17 Claims, 5 Drawing Sheets

ANTIMICROBIAL ANTIFOAM COMPOSITIONS AND METHODS

RELATED PATENT APPLICATIONS

This application is a division of application Ser. No. 378,563 filed Jul. 7, 1989, now U.S. Pat. No. 5,073,298, which is a continuation-in-part of application U.S. Ser. No. 07/221,581, filed Jul. 20, 1988, now abandoned.

BACKGROUND OF THE INVENTION

This invention relates to an antifoam composition including particulate material, the particulate material of the antifoam composition having adhered thereto an antimicrobial agent which functions to prevent bacterial spoilage.

Antimicrobial agents are chemical compositions that are used to prevent microbiological contamination and deterioration of products, materials, and systems. Particular areas of application of antimicrobial agents and compositions are, for example, cosmetics, disinfectants, sanitizers, wood preservation, food, animal feed, cooling water, metalworking fluids, hospital and medical uses, plastics and resins, petroleum, pulp and paper, textiles, latex, adhesives, leather and hides, and paint slurries. Of the diverse categories of antimicrobial agents and compositions, quaternary ammonium compounds represent one of the largest of the classes of antimicrobial agents in use. At low concentrations, quaternary ammonium type antimicrobial agents are bacteriostatic, fungistatic, algistatic, sporostatic, and tuberculostatic. At medium concentrations they are bactericidal, fungicidal, algicidal, and viricidal against lipophilic viruses. Silicone quaternary ammonium salt compounds are well known as exemplified by U.S. Pat. No. 3,560,385, issued Feb. 2, 1971, and the use of such compounds as antimicrobial agents is taught, for example, in a wide variety of patents such as U.S. Pat. Nos. 3,730,701, issued May 1, 1973, and 3,817,739, issued Jun. 18, 1974, where the compounds are used to inhibit algae; 3,794,736, issued Feb. 26, 1974, and 3,860,709, issued Jan. 14, 1975, where they are employed for sterilizing or disinfecting a variety of surfaces and instruments; 3,865,728, issued Feb. 11, 1975, where the compounds are used to treat aquarium filters; 4,259,103, issued Mar. 31, 1981; and in British Patent No. 1,386,876, of Mar. 12, 1975. Published unexamined European Application No. 228464 of Jul. 15, 1987, teaches that microorganisms on plants can be killed by the application thereto of an aqueous mixture of a surfactant and an organosilicon quaternary ammonium compound. In a particular application of an antimicrobial silicone quaternary ammonium compound, a paper substrate is rendered resistant to the growth of microorganisms in U.S. Pat. No. 4,282,366, issued Aug. 4, 1981. In U.S. Pat. No. 4,504,541, issued Mar. 12, 1985, an antimicrobial fabric is disclosed which is resistant to discoloration and yellowing by treatment of the fabric with a quaternary ammonium base containing an organosilicone. U.S. Pat. No. 4,615,937, issued Oct. 7, 1986, as well as its companion U.S. Pat. No. 4,692,374, issued Sep. 8, 1987, relate to wet wiper towelettes having an antimicrobial agent substantive to the fibers of the web and being an organosilicon quaternary ammonium compound. In a series of Burlington Industries, Inc. U.S. Pat. Nos. 4,408,996, issued Oct. 11, 1983, 4,414,268, issued Nov. 8, 1983, 4,425,372, issued Jan. 10, 1984, and 4,395,454, issued Jul. 26, 1983, such compounds are disclosed to be useful in surgical drapes, dressings, and bandages. This same assignee also discloses these compounds as being employed in surgeons' gowns in U.S. Pat. Nos. 4,411,928, issued Oct. 25, 1983, and 4,467,013, issued Aug. 21, 1984. Organosilicon quaternary ammonium compounds have been employed in carpets, in U.S. Pat. No. 4,371,577, issued Feb. 1, 1983; applied to walls, added to paints, and sprayed into shoes, in U.S. Pat. No. 4,394,378, issued Jul. 19, 1983; applied to polyethylene surfaces and used in pillow ticking in U.S. Pat. No. 4,721,511, issued Jan. 26, 1988; in flexible polyurethane foams of fine-celled, soft, resilient articles of manufacture in U.S. Pat. No. 4,631,297, issued Dec. 23, 1986; and mixed with a surfactant in Japanese Kokai Application No. 58-156809, filed Aug. 26, 1983, of Sanyo Chemical Industries, Ltd., for the purpose of achieving uniformity of distribution of the compounds to a surface. Thus, the versatility of such compositions is readily apparent.

A defoamer or antifoam agent is a material which, when added in low concentration to a foaming liquid, controls the foam problem. The defoamer equilibrates the rate of foam collapse with the rate of foam formation. Such materials, in addition, remove unsightly and troublesome surface foam, improve filtration, watering, washing, and drainage, of various types of suspensions, mixtures, and slurries. Defoamers have found application traditionally in such areas of use as the pulp and paper industry, paints and latex, coating processes, fertilizers, textiles, fermentation processes, metal working, adhesive, caulk and polymer manufacture, the sugar beet industry, oil well cement, cleaning compounds, cooling towers, and in chemical processes of varied description such as municipal and industrial primary and secondary waste water treatment facilities. It is essential for a defoamer that it be inert and not capable of reacting with the product or system in which it is used, and that it have no adverse effect on the product or system. The components of a defoamer generally consist of primary and secondary antifoam agents, a carrier, an emulsifier, and optionally a stabilizing agent. The primary antifoam agent is the main ingredient of the defoamer and includes materials such as hydrophobic silica treated silica, fatty amides, hydrocarbon waxes, and fatty acids and esters. In particular, hydrophobic silica is finely divided silica coated with chemisorbed silica. The silica is dispersed in hydrocarbon oil and the hydrophobic silica particles present a low energy silicon surface to the foamed environment. In the absence of the hydrocarbon oil, hydrophobic silica itself has no defoaming capacity. The secondary antifoam agent acts synergistically with the primary antifoam agent and includes such materials as silicones, and fatty alcohols and esters. Carriers frequently comprise hydrocarbon oils, water, fatty alcohols and esters, and solvents. Emulsifiers such as esters, ethoxylated compounds, sorbitan esters, silicones, and alcohol sulfates, function to spread or introduce the primary and secondary antifoam agents and the carrier into the system. Shelf life of defoamers can be improved by stabilizing agents, and often in water-based defoamers, a preservative is added to prevent bacterial spoilage in the drum or shipping container. Such stabilizing agents have consisted of, for example, oleic acid, hexylene glycol, fatty alcohols, naphthalene sulfonates, butyl alcohol, and formaldehyde. Dispersion defoamers are finely divided particulates in insoluble vehicles such as mineral oils, kerosene, fatty alcohols, and silicone oils. Representative of such dispersion defoamers are, for example, U.S. Pat. Nos. 3,652,453, issued Mar. 28, 1972, 3,677,963, issued Jul. 18, 1972, 3,923,683, issued Dec. 2, 1975, and 4,021,355, issued May 3, 1977. The dispersed particulate has a high surface area such as silica, talc, clay, fatty amides, heavy metal soaps, and high melting point polymeric materials. Representative of such materials in U.S. Pat. No. 2,843,551, issued Jul. 15, 1968. Such particulates are treated with silicones, for example, to render them hydrophobic, as taught in U.S. Pat. No. 3,951,883, issued Apr. 20, 1976. Finely divided particles of silica may also be dispersed in polydimethylsiloxane and similar type silicones as taught, for example, in U.S. Pat. No. 4,400,288, issued Aug. 23, 1983.

As noted above, the defoamers of the prior art have often required the addition to drums and shipping containers of a preservative such as a biocide in order to prevent bacterial spoilage. This additional and separate step in the process has often proved to be cumbersome and expensive, and has not altogether been effective in that it so often overlooked entirely resulting in large batches of spoiled materials. This invention seeks to overcome such difficulties by providing an all inclusive defoamer that requires no separate step of preservative addition to drums, shipping and storage containers, but which improved defoamer includes in the defoamer composition itself, an antimicrobial agent in order to prevent microbiological contamination and deterioration of drums, shipping containers, and storage containers, of defoamer material due to bacterial spoilage. Thus, the defoamer of the present invention includes a biologically active and bactericidally active component which will combat microorganisms by either destroying all of the microbes present or preventing their proliferation to numbers that would be significantly destructive to the system sought to be protected. Hence, the defoamer of the present invention will not only perform its defoaming function but will in addition dispose of organic growths, microbes, microorganisms, bacteria, and fungi, by interfering with the metabolic process of such organisms typically found in defoamer drums, shipping containers, and storage containers, to provide lethal exposure and an inhibiting and killing action of the bacteria responsible for spoilage of such products.

SUMMARY OF THE INVENTION

This invention relates to a defoamer composition including a primary antifoam agent which includes a particulate-type material having a high surface area such as silica, a secondary antifoam agent for acting synergistically with the primary antifoam agent such as polydimethylsiloxane, a water carrier, and a quaternary ammonium salt silane compound which functions as an antimicrobial agent, fixed and adhered to the surface of the particulate material, in order that the defoamer composition be resistant to biological degradation due to the presence in the system of microorganisms. Methods of defoaming cationic, anionic, and nonionic surfactant produced foams are also disclosed.

The invention also relates to an antifoam composition for destabilizing foams produced by surfactants comprising a primary antifoam agent including a particulate material having a high surface area, a secondary antifoam agent for acting synergistically with the primary antifoam agent, and an antimicrobial agent being fixed and adhered to the surface of the particulate material, the antimicrobial agent being an organosilane having the general formula selected from the group consisting of

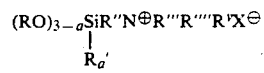

and

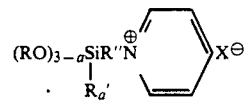

wherein, in each formula,
R is an alkyl radical of 1 to 4 carbon atoms or hydrogen;
a has a value of 0, 1 or 2;
$R'$ is a methyl or ethyl radical;
$R''$ is an alkylene group of 1 to 4 carbon atoms;
$R'''$, $R''''$ and $R^v$ are each independently selected from a group consisting of alkyl radicals of 1 to 18 carbon atoms, $-CH_2C_6H_5$, $-CH_2CH_2OH$, $-CH_2OH$, and $-(CH_2)_xNHC(O)R^{vi}$, wherein x has a value of from 2 to 10 and $R^{vi}$ is a perfluoroalkyl radical having from 1 to 12 carbon atoms;
X is chloride, bromide, fluoride, iodide, acetate or tosylate.

Further, the invention relates to a process for destabilizing foams produced by cationic, anionic, and nonionic surfactants comprising adding to the system producing the foams an effective amount of an antifoam composition including a primary antifoam agent comprised of a particulate material having a high surface area, a secondary antifoam agent for acting synergistically with the primary antifoam agent, and an antimicrobial agent being fixed and adhered to the surface of the particulate material, the antimicrobial agent being an organosilane having the general formula selected from the group consisting of

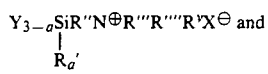 and

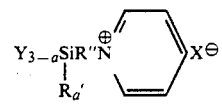

wherein, in each formula,
Y is R or RO where R is an alkyl radical of 1 to 4 carbon atoms or hydrogen;
a has a value of 0, 1 or 2;
$R'$ is a methyl or ethyl radical;
$R''$ is an alkylene group of 1 to 4 carbon atoms;
$R'''$, $R''''$ and $R^v$ are each independently selected from a group consisting of alkyl radicals of 1 to 18 carbon atoms, $-CH_2C_6H_5$, $-CH_2CH_2OH$, $-CH_2OH$, and $-(CH_2)_xNHC(O)R^{vi}$, wherein x has a value of from 2 to 10 and $R^{vi}$ is a perfluoroalkyl radical having from 1 to 12 carbon atoms;
X is chloride, bromide, fluoride, iodide, acetate or tosylate.

The invention also relates to a method for varying the hydrophobicity of particulate silica by treating the silica with the above referred to organosilane antimicrobial agent in varying amounts in order to fix and adhere to the surface of the particulate silica the organosilane antimicrobial agent. Thus, the silica is hydrophilic when the organosilane antimicrobial agent is present in a first amount, whereas in a second amount the silica is hydrophobic. For example, when the ratio of the organosilane antimicrobial agent and silica is about 0.1, the silica is hydrophilic. This provides an antimicrobial silane treated silica that is easily dispersible in water. At ratios of about 0.25 and above, however, the silica is hydrophobic. The hydrophobicity of the silica changes with and is a function of the surface coverage of the organosilane antimicrobial agent. Thus, the hydrophobicity increases from 0.25 to 4.0 as shown in Table A. This is a distinct advantage since silica is typically hydrophobed by tumble blending the silica in hexamethyldisilazane. The tumble blending technique is a non-aqueous solvent type of treatment, whereas in accordance with the teaching of the present invention, the silica can be hydrophobed with either aqueous or non-aqueous solvent treatment methods. Because an aqueous system is safer, less flammable, and environmentally more acceptable, than organic solvent systems, for example, the benefits of the method of the present invention can be appreciated. The silane modified silica surfaces provided in accordance with the concepts of the herein described invention are also durable and non-leachable. In addition to being antimicrobially active, the surfaces, as noted above, have characteristics of hydrophobicity-hydrophilicity that is variable. In contrast to traditional processes for rendering such surface hydrophobic, the treatment process of this invention is less complex, and the silica produced thereby is at least equal to if not superior in performance to otherwise standard varieties of hydrophobic silicas. The change in hydrophobicity of the silica in response to the surface coverage of the organosilane antimicrobial agent hereinafter referred to as TMS, is more readily apparent from a consideration of the Table A set forth hereinbelow:

TABLE A

| Ratio of TMS*/Silica (Percent by Weight) | Hydrophobic/Hydrophilic |
| --- | --- |
| 0.0 | Hydrophilic |
| 0.1 | Hydrophilic |
| 0.25 | Hydrophobic |
| 0.5 | Hydrophobic |
| 1.0 | Hydrophobic |
| 2.0 | Hydrophobic |
| 4.0 | Hydrophobic |

* = 3-(trimethoxysilyl)-propyl dimethyloctadecyl ammonium chloride

It is therefore an object of the present invention to provide a new type of defoaming agent in which a separate ingredient of a preservative to prevent bacterial spoilage may be dispensed with, and wherein the particulate of the defoamer composition has adhered thereto an antimicrobial agent which otherwise acts as the preservative of the composition.

It is also an object of the present invention to provide a defoamer composition which will not only handle the foaming problem effectively, but which will in addition act to prevent system spoilage due to the action of bacteria.

It is further an object of the present invention to provide an antifoam agent that will destabilize foams produced from cationic, anionic, and nonionic surfactants, and which antifoam agent does not require the separate addition to the system of another antimicrobial composition in order to survive in a system contaminated with microorganisms.

The compositions of the present invention act in preventing microbiological contamination and deterioration of products, materials, and systems. For example, 3-(trimethoxysilyl)propyldimethyloctadecylammonium chloride, herein referred to as TMS, is an effective antimicrobial agent in which the active ingredient hydrolyzes in water and reacts with substrates with which it is brought into contact. These substrates demonstrate nonleaching broad spectrum antimicrobial activity. By including such an antimicrobial component in the antifoam composition, the benefits of both types of compositions are realized as against both functioning independently one from the other. Hence, the compositions set forth in the present invention possess unique features and advantages over state of the art defoamers in that they are capable of not only destabilizing surfactant foams but also prevent spoilage of such systems because of biological contamination.

These and other features, objects, and advantages, of the present invention will become apparent from the following detailed description of the invention.

IN THE DRAWING

FIG. 1 is a graphical representation of the foaming characteristics of one percent by weight aqueous solutions of three untreated surfactants. The foam height in inches for each surfactant is plotted against time in minutes. The surfactants are TRITON ® X-100, a registered trademark for a material marketed by Rohm & Haas, Philadelphia, Pa., a nonionic surfactant of the formula $C_8H_{17}C_6H_4O(CH_2CH_2O)_{10}OH$, hereinafter referred to as TX100; sodium dodecyl sulfate an anionic surfactant of the formula $CH_3(CH_2)_{11}SO_4Na$, hereinafter referred to as SDS; and dodecyltrimethylammonium bromide a cationic surfactant of the formula $CH_3(CH_2)_{11}N(CH_3)_3Br$, hereinafter referred to as DTAB.

FIG. 2 is a graphical representation similar to FIG. 1 except that DTAB is shown separately and including the antifoam emulsion of the present invention showing the effect of the addition of the antifoam. The antifoam was added in a concentration of 0.5 parts per million based on the weight of silica and polydimethylsiloxane constituents in the antifoam formulation. The four differently shaded bars indicate formulations wherein the content of the antimicrobial agent of the present invention was varied. In the legend, the first set of numbers reading 0.5 corresponds to the concentration of the antifoam referred to above, whereas the second set of numbers reading 1, 0.5, 0.25, and 0.1, correspond to the ratio of the antimicrobial agent and silica set forth in Table I in the specification.

FIGS. 3 and 4 are the same as FIG. 2 except that FIGS. 3 and 4 are specific to TX100 and SDS, respectively.

FIG. 5 is a graphical representation illustrating the effect of the chain length of the carbon atoms in the alkyl radical $R^v$ group on foaming. Compounds including $C_6$, $C_{16}$, and $C_{18}$, carbon atom $R^v$ chain lengths were employed in systems foamed with TX100 and SDS. The relative foam height is expressed for each of the $C_6$, $C_{16}$, and $C_{18}$, compounds employed in each of the TX100 and SDS systems. The $C_{18}$ compound practically eliminated all foam in the TX100 system and hence is only slightly visible in the graphical representation. The higher chain length compounds $C_{16}$ and $C_{18}$ can be seen to be of more effect than the compound of chain length C$_6$.

DETAILED DESCRIPTION OF THE INVENTION

Figure 1:
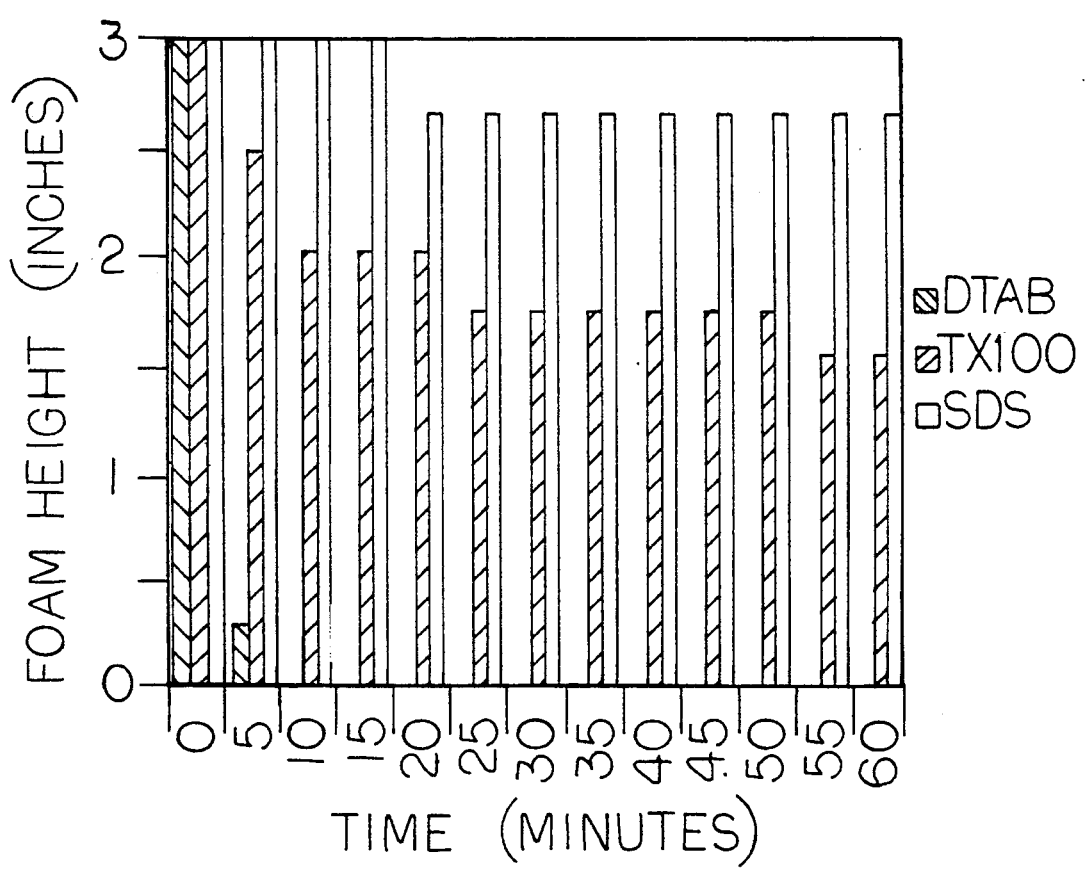

Ammonium compounds in which all of the hydrogen atoms have been substituted by alkyl groups are called quaternary ammonium salts. These compounds may be represented in a general sense by the formula:

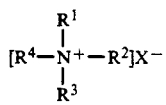

The nitrogen atom includes four covalently bonded substituents that provide a cationic charge. The R groups can be any organic substituent that provides for a carbon and nitrogen bond with similar and dissimilar R groups. The counterion X is typically halogen. Use of quaternary ammonium compounds is based on the lipophilic portion of the molecule which bears a positive charge. Since most surfaces are negatively charged, solutions of these cationic surface active agents are readily adsorbed to the negatively charged surface. This affinity for negatively charged surfaces is exhibited by 3-(trimethoxysilyl)propyldimethyloctadecyl ammonium chloride of the formula:

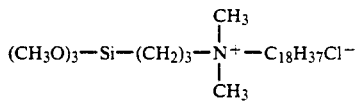

In the presence of moisture, this antimicrobial agent imparts a durable, wash resistant, broad spectrum biostatic surface antimicrobial finish to a substrate. The organosilicon quaternary ammonium compound is leach resistant, nonmigrating, and is not consumed by microorganisms. It is effective against gram positive and gram negative bacteria, fungi, algae, yeasts, mold, rot, mildew, and malodor. The silicone quaternary ammonium salt provides durable, bacteriostatic, fungistatic, and algistatic surfaces. It can be applied to organic or inorganic surfaces as a dilute aqueous or solvent solution of 0.1-1.5 percent by weight of active ingredient. After the alkoxysilane is applied to a surface, it is chemically bonded to the substrate by condensation of the silanol groups at the surface. The compound is a low viscosity, light to dark amber liquid, soluble in water, alcohols, ketones, esters, hydrocarbons, and chlorinated hydrocarbons. The compound has been used in applications such as, for example, socks, filtration media, bed sheets, blankets, bedspreads, carpet, draperies, fire hose fabric materials, humidifier belts, mattress pads, mattress ticking, underwear, nonwoven disposable diapers, nonwoven fabrics, outerwear fabrics, nylon hoisery, vinyl paper, wallpaper, polyurethane cushions, roofing materials, sand bags, tents, tarpaulins, sails, rope, althetic and casual shoes, shoe insoles, shower curtains, toilet tanks, toilet seat covers, throw rugs, towels, umbrellas, upholstery fiberfill, intimate apparel, wiping cloths, and medical devices.

The antifoams of the present invention were prepared in accordance with Examples set forth hereinbelow, and in the Examples as well as in the Tables, the antimicrobial composition identified as TMS refers to a product manufactured by the Dow Corning Corporation, Midland, Mich., as an antimicrobial agent. This compound is 3-(trimethoxysilyl)-propyldimethyloctadecyl ammonium chloride referred to above diluted to forty-two percent active ingredients by weight with methanol.

The antifoams of the present invention were prepared by using quaternary ammonium silane functionalized silicas. The silica employed to prepare the antifoams was QUSO ® G35, a silica distributed by North American Silica Company, Teterboro, N.J. The silicas were prepared by refluxing in a polar solvent resulting in a silylation reaction shown below:

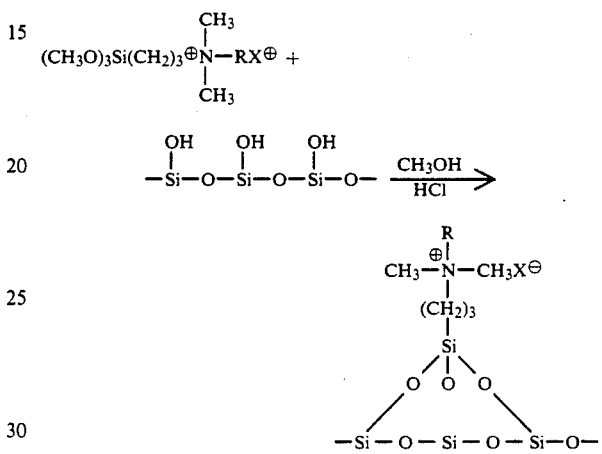

where
R = C$_{18}$H$_{37}$, and
X = halogen.

EXAMPLE I

The antifoam formulation of the present invention was prepared by combining one gram of silica, nine grams of polydimethylsiloxane fluid of a viscosity of about three hundred-fifty centistokes, one hundred-eighty grams of water, and ten grams of METHOCEL ®, a product and trademark of The Dow Chemical Company, Midland, Mich., for methylcellulose. The silica used was QUSO ® G 35. The content of the silica and polydimethylsiloxane fluid was used for calculations relating to parts per million solids, to the exclusion of the water and methylcellulose content in the antifoam formulation. The TMS antimicrobial agent content in the antifoam emulsion formulation can be seen by reference to Table I.

TABLE I

| Ratio of TMS/Silica | Concentration of TMS (parts per million) |
|---|---|
| 0.10 | 125 |
| 0.25 | 250 |
| 0.50 | 500 |
| 1.00 | 500 |
| 2.00 | 500 |
| 4.00 | 500 |

Silicas used in the preparation of the antifoam emulsions were tested in accordance with a series of procedures set forth hereinbelow.

The anion of an aqueous sodium salt of bromphenol blue can be complexed with the cation of polymerized silanes of this invention while on a substrate. The blue colored complex, substantive to a water rinse, is qualitatively indicative of the presence of the cation on the substrate thus indicating the extent of antimicrobial agent on a given substrate. A comparison of the intensity of retained blue color to a color standard is used as a check to determine if the treatment has been applied properly and durably.

The method consists of preparing a 0.02 to 0.04 weight percent solution of bromphenol blue in distilled water. This solution is made alkaline using a few drops of saturated $Na_2CO_3$ solution per 100 milliliters of the solution. Two to three drops of this solution are placed on the treated substrate and allowed to stand for two minutes. The substrate is then rinsed with copious amounts of tap water and the substrate is observed for a blue stain and it is compared to a color standard.

For a spectrophotometric determination, the following test is used.

The sodium salt of bromphenol blue is depleted from a standard solution by complexing with the cations on a treated substrate. The change in bromphenol blue concentration is determined spectrophotometrically or by comparison with color standards whereby the level of substrate treatment by the cationic silane is determinable.

The method consists of preparing a 0.02 weight percent standard solution of bromphenol blue in distilled water. It is made alkaline with a few drops of saturated $Na_2CO_3$ solution per 100 milliliters of bromphenol blue solution. The color of this solution is purple.

The blank solution is adjusted to yield a 10 to 12% transmittance reading when measured in 1 cm cells using a spectrophotometer set at 589 nm by the following method.

Fill a container $\frac{3}{4}$ full of distilled water and add 2 ml of the 0.02% standard bromphenol blue solution for every 50 ml of distilled water. Add 0.5 ml of a 1% Triton ® X-100 surfactant (manufactured by Rohm and Haas, Philadelphia, Pa., USA) aqueous solution for every 50 ml of water. Mix, and using the spectrophotometer, determine the maximum absorbance. Adjust the upper zero to 100% transmittance with distilled water. Check the percent transmittance of the working bromphenol blue solution at the maximum absorbance setting. Adjust the blank solution to 10 to 12% transmittance with either water or bromphenol blue standard solution as necessary.

The samples of treated substrate are tested by placing 0.5 gram samples of the substrate standards in a flask large enough for substantial agitation of the sample and the test solution. Add 50 ml of the working solution. Agitate for 20 minutes on a wrist-action shaker. Fill the test curvette with the test solution. Centrifuge if particulate matter is present. Measure the % transmittance at the wavelength set forth above. The transmittance is compared against a standard curve prepared by preparing several substrate samples of known concentration of the cationic silane. For example, samples containing a known amount of cationic silane at, for example, 0%, 0.25%, 0.50%, 0.75% and 1% are read spectrophotometrically and a curve is plotted.

The foregoing bromophenol blue test was conducted using TMS treated silica, and the test results can be seen in Table II. In Table II, it can be seen that the TMS was effectively bound to the treated silica.

TABLE II

| SAMPLE | BROMOPHENOL BLUE | |
|---|---|---|
| | % T | Color Intensity[1] |
| Untreated | 23 | W |
| 1 part silica 0.1 part TMS | 92 | P |
| 1 part silica 0.25 parts TMS | 96 | P |
| 1 part silica 0.5 parts TMS | 97 | MB |
| 1 part silica 1.0 parts TMS | 92 | MB |

1 = Depth of Blue: P = purple; DB = dark blue; MB = medium blue; LB = light blue; and W = white.

The silanes useful in this invention have the general formula

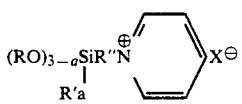

It should be noted that generically, these materials are quaternary ammonium salts of silanes. Most of the silanes falling within the scope of this invention are known silanes and references disclosing such silanes are numerous. One such reference, U.S. Pat. No. 4,259,103, issued to James R. Malek and John L. Speier, on Mar. 31, 1981, discusses the use of such silanes to render the surfaces of certain substrates antimicrobial. Canadian Patent No. 1,010,782, issued to Charles A. Roth shows the use of fillers treated with certain silanes to be used in paints and the like to give antimicrobial effects.

Numerous other publications have disclosed such silanes, namely, A. J. Isquith, E. A. Abbott and P. A. Walters, Applied Microbiology, December, 1972, pages 859–863; P. A. Walters, E. A. Abbott and A. J. Isquith, Applied Microbiology, 25, No. 2, p. 253–256, February 1973 and E. A. Abbott and A. J. Isquith, U.S. Pat. No. 3,794,736 issued Feb. 26, 1974, U.S. Pat. No. 4,406,892, issued Sep. 27, 1983, among others.

For purposes of this invention, the silanes can be used neat or they can be used in solvent or aqueous-solvent solutions. When the silanes are used neat, the inventive process is preferably carried out in a system in which some small amount of water is present. If it is not possible to have a system with some small amount of water present, then a water soluble or water-dispersable, low molecular weight hydrolyzate of the silane may be used. What is important is the fact that the durability of any effect produced by the silane as part of a product requires that the silane molecule react with a surface to a certain extent. The most reactive species, as far as the silanes are concerned, is the $\equiv$SiOH that is formed by hydrolysis of the alkoxy groups present on the silane. The $\equiv$SiOH groups tend to react with the surface and bind the silanes to the surface. It is believed by the inventor even though the prime mode of coupling to the surface system is by the route described above, it is also believed by the inventor that the alkoxy groups on the silicon atom may also participate in their own right to bind to the surface.

Preferred for this invention is a reactive surface containing some small amount of water. By "reactive", it is meant that the surface must contain some groups which will react with some of the silanols generated by hydrolysis of the silanes of this invention.

R in the silanes of this invention are alkyl groups of 1 to 4 carbon atoms. Thus, useful as R in this invention are the methyl, ethyl, propyl and butyl radicals. In the above formulas RO can also be R. R can also be hydrogen thus indicating the silanol form, i.e. the hydrolyzate. The value of a is 0, 1 or 2 and R' is a methyl or ethyl radical.

R″ for purposes of this invention is an alkylene group of 1 to 4 carbon atoms. Thus, R″ can be alkylene groups such as methylene, ethylene, propylene, and butylene. R‴, R″″, and R$^v$ are each independently selected from a group which consists of alkyl radicals of 1 to 18 carbons, $-CH_2C_6H_5$, $-CH_2CH_2OH$, $-CH_2OH$, and $-(CH_2)_xNHC(O)R^{vi}$. x has a value of from 2 to 10 and R$^{vi}$ is a perfluoroalkyl radical having from 1 to 12 carbon atoms. X is chloride, bromide, fluoride, iodide, acetate or tosylate.

Preferred for this invention are the silanes of the general formula

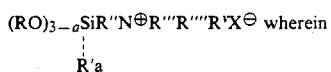

R is methyl or ethyl; a has a value of zero; R″ is propylene; R‴ is methyl or ethyl; R″″ and R$^v$ are selected from alkyl groups containing 1 to 18 carbon atoms wherein at least one such group is larger than eight carbon atoms and x is either chloride, acetate or tosylate.

Exemplary compounds are those silanes having the formula

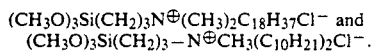

As indicated above, most of these silanes are known from the literature and methods for their preparation are known as well. See, for example, U.S. Pat. Nos. 4,282,366, issued Aug. 4, 1981; 4,394,378, issued Jul. 19, 1983, and 3,661,963 issued May 9, 1972, among others.

Specific silanes within the scope of the invention are represented by the formulae:

$(CH_3O)_3Si(CH_2)_3N^+(CH_3)_2C_{18}H_{37}Cl^-$, $(CH_3O)_3Si(CH_2)_3N^+(CH_3)_2C_{18}H_{37}Br^-$, $(CH_3O)_3Si(CH_2)_3N^+(C_{10}H_{21})_2CH_3Cl^-$, $(CH_3O)_3Si(CH_2)_3N^+(C_{10}H_{21})_2CH_3Br^-$, $(CH_3O)_3Si(CH_2)_3N^+(CH_3)_3Cl^-$, $(CH_3O)_3SiCH_2CH_2CH_2P^+(C_6H_5)_3Cl^-$, $(CH_3O)_3SiCH_2CH_2CH_2P^+(C_6H_5)_3Br^-$, $(CH_3O)_3SiCH_2CH_2CH_2P^+(CH_3)_3Cl^-$, $(CH_3O)_3SiCH_2CH_2CH_2P^+(C_6H_{13})_3Cl^-$, $(CH_3)_3Si(CH_2)_3N^+(CH_3)_2C_{12}H_{25}Cl^-$, $(CH_3)_3Si(CH_2)_3N^+(C_{10}H_{21})_2CH_3Cl^-$, $(CH_3)_3Si(CH_2)_3N^+(CH_3)_2C_{18}H_{37}Cl^-$, $(CH_3O)_3Si(CH_2)_3N^+(CH_3)_2C_4H_9Cl^-$, $(C_2H_5O)_3Si(CH_2)_3N^+(CH_3)_2C_{18}H_{37}Cl^-$, $(CH_3O)_3Si(CH_2)_3N^+(CH_3)_2CH_2C_6H_5Cl^-$, $(CH_3O)_3Si(CH_2)_3N^+(CH_3)_2CH_2CH_2OHCl^-$,

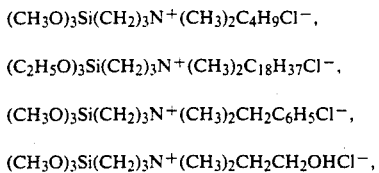

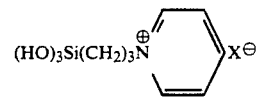

$(CH_3O)_3Si(CH_2)_3N^+(CH_3)_2(CH_2)_3NHC(O)(CF_2)_6CF_3Cl^-$, $(CH_3O)_3Si(CH_2)_3N^+(C_2H_5)_3Cl^-$,

X is chlorine in the above specific silanes.

As noted hereinbefore, hydrophobic silica is a component of antifoam agents. The silica surface is hydrophobed by treatment with dimethylsiloxanes. In accordance with the present invention, silica is treated with the TMS antimicrobial agent, and the treated silica can be substituted for the silica of standard and typical antifoam formulations containing dimethylsiloxane, water, and silica.

The polydimethylsiloxanes used herein can be high molecular weight polymers having a molecular weight in the range from about 200 to about 200,000, and have a kinematic viscosity in the range from about 20 to 2,000,000 mm/s, preferably from about 500 to 50,000 mm/s, more preferably from about 3,000 to about 30,000 mm/s at 25° C. The siloxane polymer is generally end-blocked either with trimethylsilyl or hydroxyl groups but other end-blocking groups are also suitable. The polymer can be prepared by various techniques such as the hydrolysis and subsequent condensation of dimethyldihalosilanes, or by the cracking and subsequent condensation of dimethylcyclosiloxanes.

The polydimethylsiloxane is present in combination with particulate silica. Such combinations of silicone and silica can be prepared by affixing the silicone to the surface of silica for example by means of the catalytic reaction disclosed in U.S. Pat. No. 3,235,509. Foam regulating agents comprising mixtures of silicone and silica prepared in this manner preferably comprise silicone and silica in a silicone:silica ratio of from 20:1 to 200:1, preferably about 25:1 to about 100:1. The silica can be chemically and/or physically bound to the silicone in an amount which is preferably about 0.5% to 5% by weight, based on the silicone. The particle size of the silica employed in such silica/silicone foam regulating agents should preferably be not more than 100 millimicrons preferably from 10 millimicrons to 20 millimicrons, and the specific surface area of the silica should exceed about 50 m$^2$/g.

Alternatively, silicone and silica can be prepared by admixing a silicone fluid of the type herein disclosed with a hydrophobic silica having a particle size and surface area in the range disclosed above. Any of several known methods may be used for making a hydrophobic silica which can be employed herein in combination with a silicone as the foam regulating agent. For example, a fumed silica can be reacted with a trialkyl chlorosilane (i.e., "silanated") to affix hydrophobic trialkylsilane groups on the surface of the silica. In a preferred and well known process, fumed silica is contacted with trimethylchlorosilane.

A preferred material comprises a hydrophobic silanated (most preferably trimethylsilanated) silica having a particle size in the range from about 10 millimicrons to 20 millimicrons and a specific surface area above about 50 m$^2$/g intimately admixed with a dimethyl silicone fluid having a molecular weight in the range of from about 500 to about 200,000, at a weight ratio of silicone to silanated silica of from about 20:1 to about 200:1, preferably from about 20:1 to about 100:1.

Yet another type of material suitable herein comprises polydimethylsiloxane fluid, a silicone resin and silica. The silicone "resins" used in such compositions can be any alkylated silicone resins, but are usually those prepared from methylsilanes. Silicone resins are commonly described as "three-dimensional" polymers arising from the hydrolysis of alkyl trichlorosilanes, whereas the silicone fluids are "two-dimensional" polymers prepared from the hydrolysis of dichlorosilanes. The silica components of such compositions are the microporous materials such as the fumed silica aerogels and xerogels having the particle sizes and surface areas herein-above disclosed.

The mixed polydimethylsiloxane fluid/silicone resin/silica materials useful in the present compositions can be prepared in the manner disclosed in U.S. Pat. No. 3,455,839. Preferred materials of this type comprise:

(a) from about 10 parts to about 100 parts by weight of a polydimethylsiloxane fluid having a viscosity in the range from 20 to 30,000 mm/s at 25° C.:

(b) 5 to 50 parts by weight of a siloxane resin composed of $(CH_3)_3SiO_{\frac{1}{2}}$ units and $SiO_2$ units in which the ratio of the $(CH_3)_3SiO_{\frac{1}{2}}$ units to the $SiO_2$ units is within the range of from 0.6/1 to 1.2/1: and (c) 0.5 to 5 parts by weight of a silica aerogel. Such mixtures can also be sorbed onto and into a water-soluble solid.

In any event, and in accordance with the present invention, what is provided is a basic defoamer formulation as outlined above, with the novel addition of an antimicrobial agent fixed and adhered to the surface of the silica. With such an antimicrobial agent in place on the silica, the preservative of prior art defoamer formulations may be eliminated, and the defoamers of the present invention will destabilize foams produced from surfactants but without the necessity of the addition of an antimicrobial agent to the system as a separate ingredient in order to protect the system from contamination by microorganisms.

Antifoam compositions prepared in accordance with the present invention were tested in order to demonstrate their defoaming capabilities and to determine the effectiveness of the antifoam compositions in inhibiting biological degradation.

Figure 2:
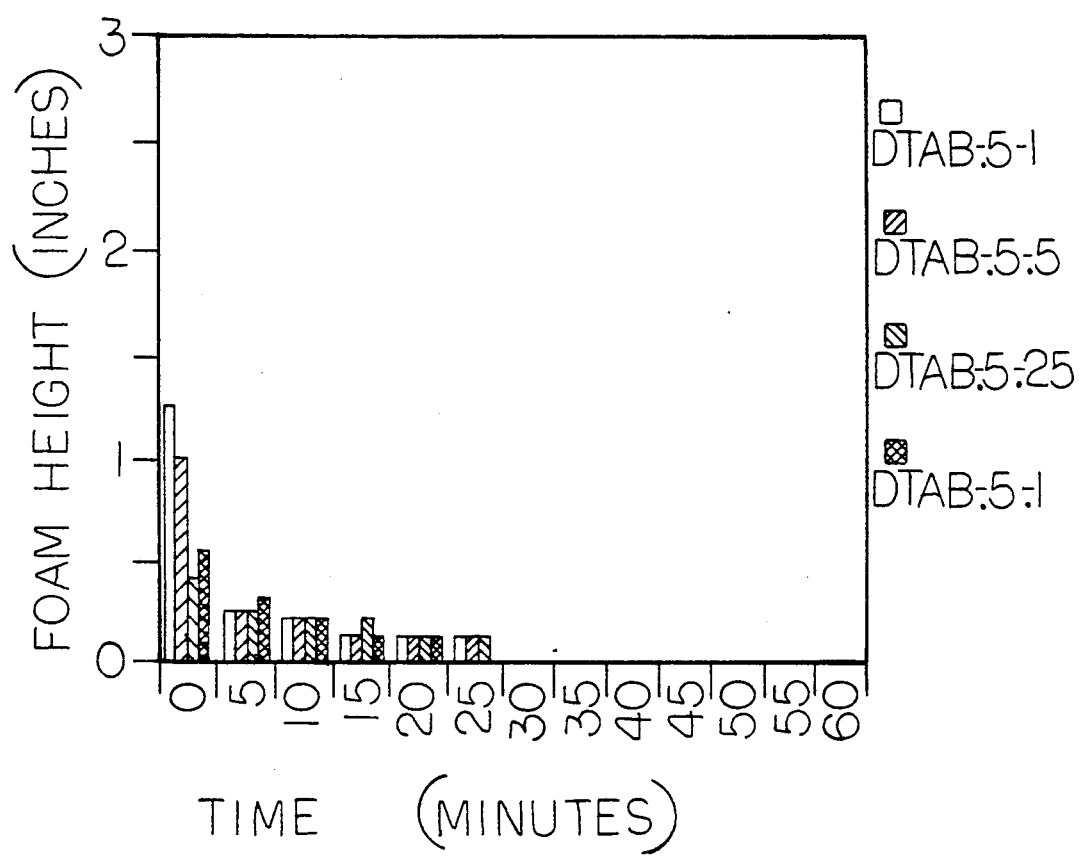
Figure 3:
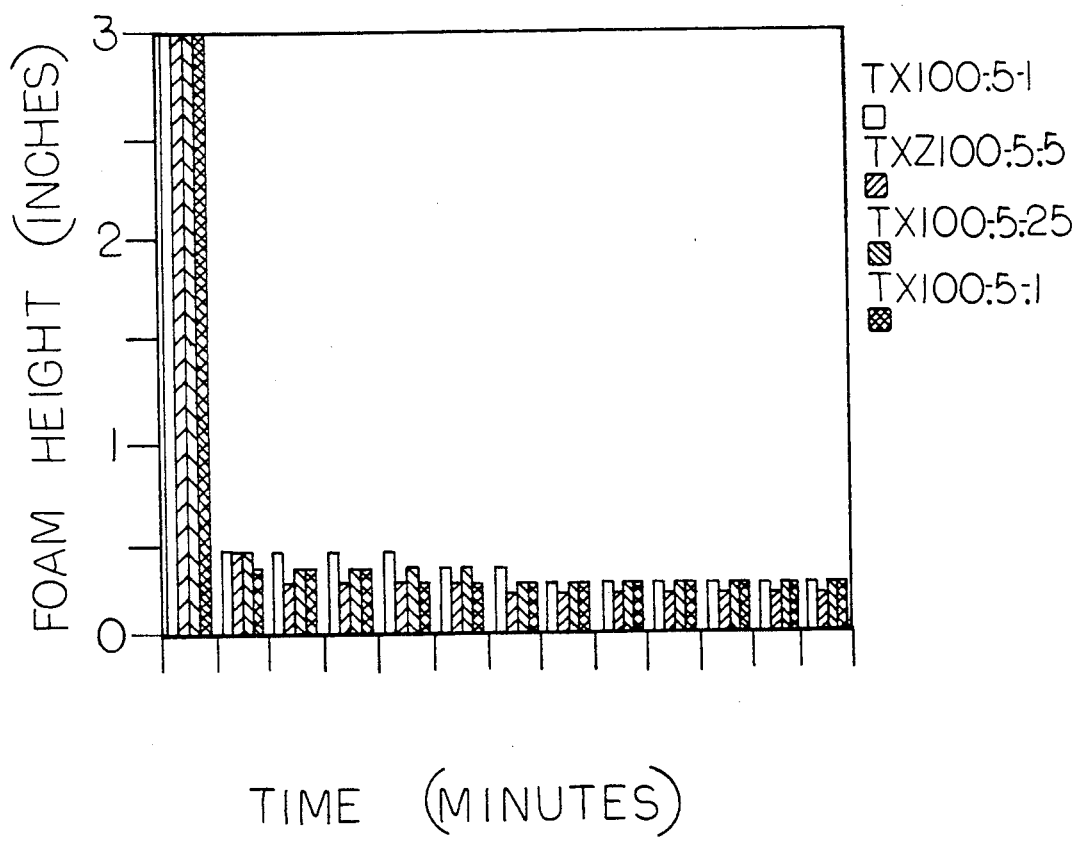
Figure 4:
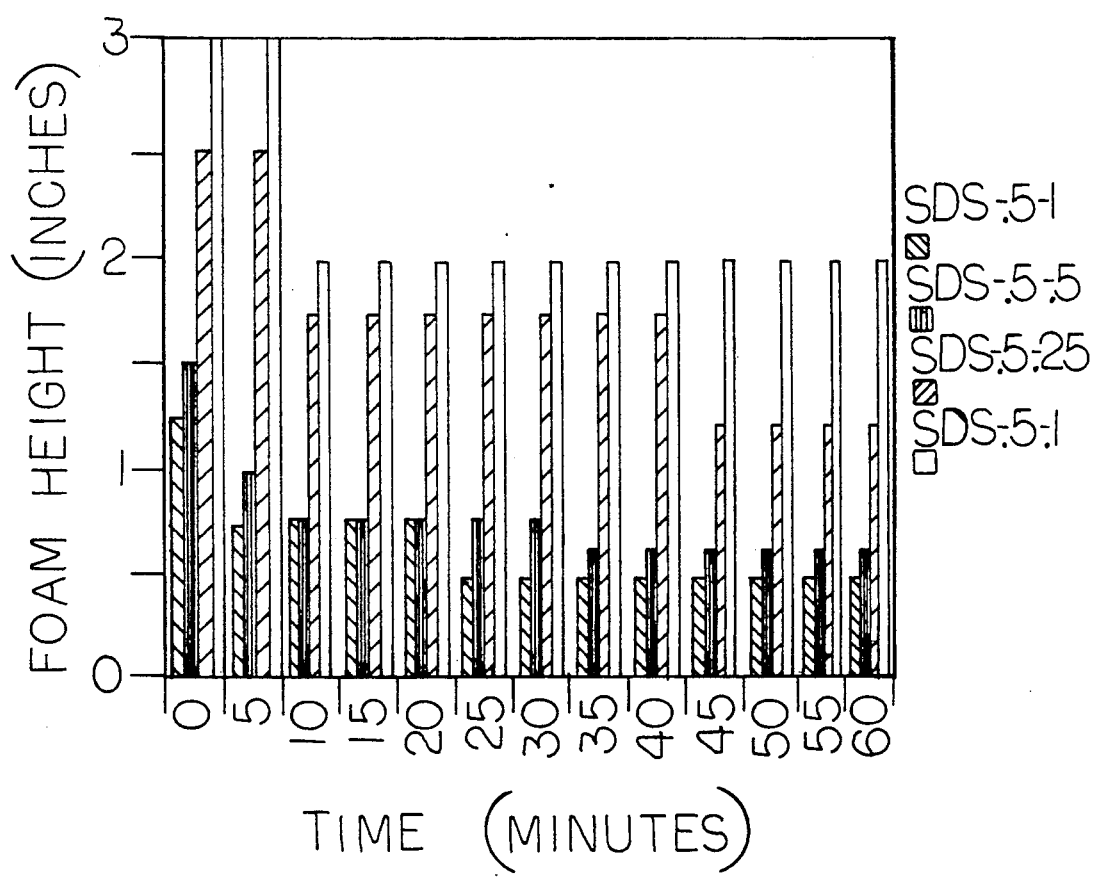

In the defoaming tests, three surfactants were selected and the foaming characteristics of each of the selected surfactants was determined initially without treatment with the antifoam emulsion of the present invention, and then each of the selected surfactants was tested separately including the antifoam emulsion of the present invention. The data from these tests is presented in FIG. 1, which is a graphical representation of the foaming characteristics of one percent aqueous solutions of the three selected untreated surfactants. The foam height in inches for each surfactant is plotted against time in minutes. The selected surfactants are TRITON ® X-100, a registered trademark for a material marketed by Rohm & Haas, Philadelphia, Pa., a nonionic surfactant of the formula $C_8H_{17}C_6H_4O(CH_2CH_2O)_{10}OH$, hereinafter referred to as TX100; sodium dodecyl sulfate an anionic surfactant of the formula $CH_3(CH_2)_{11}SO_4Na$, hereinafter referred to as SDS; and dodecyltrimethylammonium bromide, a cationic surfactant of the formula $CH_3(CH_2)_{11}N(CH_3)_3Br$, hereinafter referred to as DTAB. Following testing of the individual untreated surfactants, each surfactant was mixed with varying amounts of the antifoam emulsion of the present invention, and the defoaming capabilities of the antifoam emulsions of the present invention is graphically depicted in FIGS. 2-4. FIG. 2 is similar to FIG. 1 except that the surfactant DTAB is shown separately as well as the effect on foaming of the addition of the antifoam composition of the present invention. The antifoam is added in a concentration of 0.5 parts per million based on the weight of silica and polydimethylsiloxane constituents in the antifoam formulation, and this integer appears in the legend as representative of the antifoam concentration for each shaded area. The four shaded bars in the legend also indicate concentrations of the antimicrobial agent in the antifoam formulation wherein it can be seen that the content of the TMS antimicrobial agent of the present invention was varied. The integers ranging from 0.25 to 1 are representative of the TMS/Silica ratios shown in Table I. FIGS. 3 and 4 are the same as FIG. 2 except that FIGS. 3 and 4 are specific to TX100 and SDS, respectively.

The data used to compile FIGS. 1-5 in the drawing were obtained by a shake test employing a mechanical shaker. One hundred milliliters of a one percent by weight solution of surfactant was placed in a five hundred milliliter bottle, and the desired amount of antifoam was added, typically in the parts per million range. The bottle was shaken for five minutes and the foam measured visually with a ruler, both initially and at five minute intervals thereafter for one hour. The same test was used in order to determine the foam heights in FIG. 1 for the untreated surfactants, in which case, no antifoam was added to the bottle.

Figure 5:
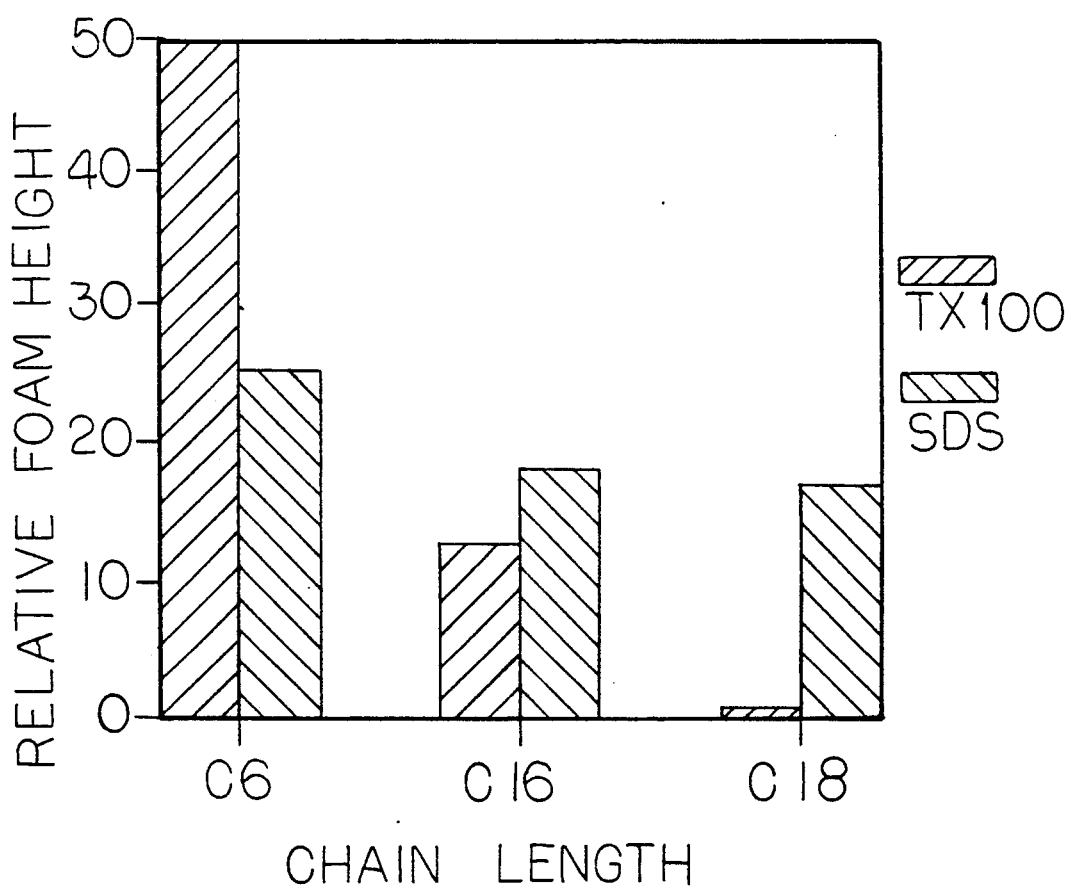

In FIG. 5 there will be seen the effect of varying the chain length of the carbon atoms in the alkyl radical $R^v$ group on foaming. Compounds including $C_6$, $C_{16}$, and $C_{18}$ carbon atom $R^v$ chain lengths were employed in sysems foamed with TX100 and SDS. The higher chain length compounds $C_{16}$ and $C_{18}$ can be seen to be of more effect than the compound of chain length $C_6$.

For example, in U.S. Pat. No. 4,395,352, issued Jul. 26, 1983, there is disclosed the treatment of silica with silicones where the alkyl groups have 1-8 carbon atoms. The '352 patent references four other U.S. Patents regarding the preparation of such solids, namely; U.S. Pat. Nos. 2,802,850; 3,634,288; 3,649,588; and 3,953,487. The '850 patent teaches methyl trichlorosilane which is not antimicrobial and is not an organosilicon quaternary ammonium compound. The '288 and '588 patents both relate to siloxanes rather than silanes, and the '487 patent discloses a silane with alkyl groups of 1-4 carbon atoms.

In contrast, and as is apparent from FIG. 5, the antimicrobial organosilicon quaternary ammonium compounds of the present invention containing in the alkyl group carbon chain lengths of $C_{16}$ and $C_{18}$, have been shown to be more effective in reducing foam than the corresponding compounds containing shorter chain lengths of the order of about six carbon atoms. These shorter carbon atom chain lengths are typical of the compounds found in the '352 patent.

The structure of each of the three exemplary compounds tested in FIG. 5 is shown as follows:

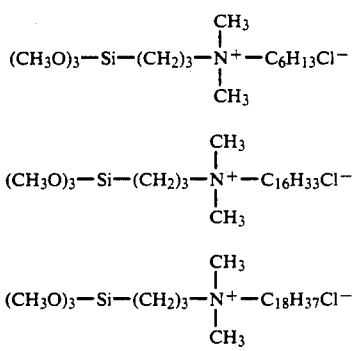

In light of FIG. 5, and in view of the foregoing discussion regarding the '352 patent, it should be apparent that the higher chain length compounds are the most preferred embodiments of the present invention. Thus, the range $C_{12}$-$C_{18}$ is the most preferred range, in particular $C_{16}$ and $C_{18}$, in contrast to the shorter $C_1$-$C_8$ chains taught by the '352 patent.

It can be seen from FIGS. 1-5 that the antifoam composition of the present invention broke the foam at a rapid rate and in addition, the antifoam composition of the present invention possesses the added benefit in that it is antimicrobial in nature as shown below.

The antimicrobial activity of a treated surface is evaluated by shaking a sample weighing 0.75 grams in a 750,000 to 1,500,000 count *Klebsiella pneumoniae* suspension for a one hour contact time. The suspension is serially diluted, both before and after contact, and cultured. The number of viable organisms in the suspensions is determined. The percent reduction based on the original count is determined. The method is intended for those surfaces having a reduction capability of 75 to 100% for the specified contact time. The results are reported as the percent reduction.

Media used in this test are nutrient broth, catalog No. 0003-01-6 and tryptone glucose extract agar, catalog No. 0002-01-7 both available from Difco Laboratories, Detroit, Mich., U.S.A. The microorganism used is *Klebsiella pneumoniae* American Type Culture Collection; Rockville, Md. U.S.A., catalog No. 4352.

The procedure used for determining the zero contact time counts is carried out by utilizing two sterile 250 ml. screw-cap Erlenmeyer flasks for each sample. To each flask is added 70 ml of sterile buffer solution. To each flask is added, aseptically, 5 ml of the organism inoculum. The flasks are capped and placed on a wrist action shaker. They are shaken at maximum speed for 1 minute. Each flask is considered to be at zero contact time and is immediately subsampled by transferring 1 ml of each solution to a separate test tube containing 9 ml of sterile buffer. The tubes are agitated with a vortex mixer and then 1 ml of each solution is transferred to a second test tube containing 9 ml of sterile buffer. Then, after agitation of the tubes, 1 ml of each tube is transferred to a separate sterile petri dish. Duplicates are also prepared. Sixteen ml of molten (42° C.) tryptone glucose extract agar is added to each dish. The dishes are each rotated ten times clockwise and ten times counterclockwise. The dishes are then incubated at 37° C. for 24 to 36 hours. The colonies are counted considering only those between 30 and 300 count as significant. Duplicate samples are averaged. The procedure used for determining the bacterial count after 1 hour is essentially the same as that used to determine the count at the zero contact time. The only difference is that pour plating is performed at the $10^0$ and $10^{-1}$ dilutions as well as at the $10^{-2}$ dilution. "Percent reduction" is calculated by the formula $$\% R = \frac{\frac{B+C}{2} - A}{\frac{B+C}{2}} 100$$

where A is the count per milliliter for the flask containing the treated substrate; B is zero contact time count per milliliter for the flask used to determine "A" before the addition of the treated substrate and C is zero contact time count per milliliter for the untreated control substrate.

The microbiological efficacy of the TMS treated silica compositions of the present invention was determined as outlined above. The antimicrobial activity was evaluated by shaking samples in *Klebsiella pneumoniae* suspension for a one hour contact time. The suspension was serially diluted both before and after contact and cultured. The number of viable organisms in the suspensions was determined. The percent reduction based on the original count was also determined. The results of the antimicrobial activity dynamic surface testing indicated that the compositions are antimicrobially active in their nature and function, and the microorganisms were substantially reduced in number. The results are shown in Table 3.

TABLE III

| Sample | Percent Reduction |
| --- | --- |
| Untreated | 0 |
| 1 part silica 0.1 part TMS | 100 |
| 1 part silica 0.25 parts TMS | 100 |
| 1 part silica 0.5 parts TMS | 100 |
| 1 part silica 1.0 parts TMS | 100 |

In order to demonstrate the biological efficacy of the antifoam emulsions, a separate test was conducted in order to confirm their activity, in addition to and in contrast to the foregoing test on the TMS treated silica which is a constituent of the antifoam emulsion. In the antifoam emulsion test, silica with saturation coverage of TMS was used at a level of 0.5% by weight based on the total antifoam emulsion formulation. The emulsion was tested by a repeated insult antimicrobial test used to evaluate "in-can" storage preservation of the antifoam emulsion. The inoculum was a mixture of 24 hour shake cultures at 32 degrees Centigrade in nutrient broth of *Pseudomonas aeruginosa*, *Pseudomonas fluorescens*, and *Pseudomonas putida*. These organisms were fresh isolates from field contaminated antifoams. They were identified by API 20E ®, Analytical Products, Plainview, N.Y. The mixed culture was diluted in phosphate buffer to deliver a concentration of $10^8$/milliliter of organisms in fifty milliliter aliquots of test antifoams. These were shaken and incubated at thirty-two degrees Centigrade. At the end of twenty-four hours, swab streaks of the samples were made on tryptic soy agar plates. These plates were incubated at thirty-two degrees Centigrade and read for growth at twenty-four and forty-eight hour intervals. The above inoculum preparation and insult protocols were repeated at three day intervals for three repetitions per sample, and the results are shown in Table IV, indicating no growth on the treated antifoam.

TABLE IV

| SAMPLE | INSULT[4] | | |
|---|---|---|---|
| | 1 | 2 | 3 |
| Treated antifoam | − | − | − |
| Untreated antifoam | + | + | + |

[4]: − = no growth
+ = growth

The particulate material of the antifoam composition of the present invention has been illustrated by means of silica, but it should be understood that other equivalent particulate materials may be used in accordance with the present invention. Thus, for example, there can be used in place of or in addition to silica, high surface area particulates such as crushed quartz, aluminum oxide, zirconium silicate, aluminum silicate, magnesium oxide, zinc oxide, talc, diatomaceous earth, iron oxide, calcium carbonate, clay, titania, zirconia, mica, ground glass, glass fiber, sand, carbon black, graphite, barium sulfate, zinc sulfate, wood flour, cork, fluorocarbon polymer powder, rice hulls, and ground peanut shells. The term "silica" as used herein is intended to include, for example, silica such as fumed silica, precipitated silica, and treated silica such as fumed silica and precipitated silica that has been reacted with an organohalosilane, a disiloxane, or disilizane.

While the antifoam compositions of the present invention are of general utility, there may be specifically mentioned by way of application their use in the petroleum and petrochemical industry such as in gas-oil separators, atmospheric and vacuum distillation units, thermal cracking operations, natural gas treatments, solvent extraction processes, lubricating oils, and asphalt. In the chemical process industry, the antifoams find application in resin manufacture, synthetic rubber manufacture, vegetable oil processing, starch manufacture, plastics manufacture, and fermentation processes. In the textile industry there may be mentioned synthetic fiber manufacture, dyeing baths, sizing baths, and latex backing. The food industry includes jams and jellies, cooking oils, dietetic soft drinks, instant coffee, and winemaking. The antifoams are applicable in the manufacture of antibiotics, and in the paper industry find utility in pulp manufacture, paper making and paper coating.

It will be apparent from the foregoing that many other variations and modifications may be made in the structures, compounds, compositions, articles of manufacture, and methods described herein without departing substantially from the essential features and concepts of the present invention. Accordingly, it should be clearly understood that the forms of the invention described herein are exemplary only and are not intended as limitations on the scope of the present invention.

That which is claimed is:

1. The method of altering the hydrophobicity of particulate silica comprising treating the silica with an organosilane in varying amounts in order to chemically bond the organosilane to the surface of the particulate silica, the organosilane having the general formula selected from the group consisting of

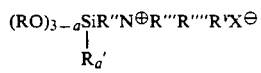

and

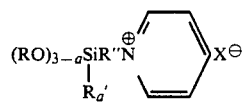

wherein, in each formula,

R is an alkyl radical of 1 to 4 carbon atoms or hydrogen;

a has a value of 0, 1 or 2;

R' is a methyl or ethyl radical;

R'' is an alkylene group of 1 to 4 carbon atoms;

R''' and R'''' are each independently selected from the group consisting of alkyl radicals of 1 to 18 carbon atoms, $-CH_2C_6H_5$, $-CH_2CH_2OH$, $-CH_2OH$, and $-(CH_2)_xNHC(O)R^{vi}$, wherein x has a value of from 2 to 10 and $R^{vi}$ is a perfluoroalkyl radical having from 1 to 12 carbon atoms;

$R^v$ is selected from the group consisting of alkyl radicals of 16 or 18 carbon atoms, $-CH_2C_6H_5$, $-CH_2CH_2OH$, $-CH_2OH$, and $-(CH_2)_xNHC(O)R^{vi}$, wherein x has a value of from 2 to 10 and $R^{vi}$ is a perfluoroalkyl radical having from 1 to 12 carbon atoms; and X is chloride, bromide, fluoride, iodide, acetate or tosylate.

2. The method of claim 1 wherein the organosilane is 3-(trimethoxysilyl)propyl dimethyloctadecyl ammonium chloride.

3. The method of claim 1 in which the organosilane is present in an amount sufficient to provide a hydrophilic silica.

4. The method of claim 1 in which the organosilane is present in an amount sufficient to provide a hydrophobic silica.

5. The method of claim 1 in which the treatment is conducted in an aqueous solvent.

6. The method of claim 1 in which the treatment is conducted in a non-aqueous solvent.

7. The method of claim 1 wherein $R^v$ is an alkyl radical of sixteen carbon atoms.

8. The method of claim 1 wherein $R^v$ is an alkyl radical of eighteen carbon atoms.

9. The method of claim 2 wherein the antimicrobial agent has the formula

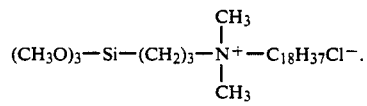

10. A method of destabilizing foams produced by surfactants in a foaming liquid comprising adding to the liquid a particulate material having an organosilane chemically bonded to the surface of the particulate, the organosilane having the general formula selected from the group consisting of

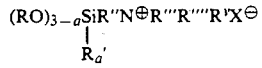

and

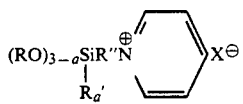

wherein, in each formula,
R is an alkyl radical of 1 to 4 carbon atoms or hydrogen;
a has a value of 0, 1 or 2;
R' is a methyl or ethyl radical;
R" is an alkylene group of 1 to 4 carbon atoms;
R''' and R'''' are each independently selected from the group consisting of alkyl radicals of 1 to 18 carbon atoms, $-CH_2C_6H_5$, $-CH_2CH_2OH$, $-CH_2OH$, and $-(CH_2)_xNHC(O)R^{vi}$, wherein x has a value of from 2 to 10 and $R^{vi}$ is a perfluoroalkyl radical having from 1 to 12 carbon atoms;
$R^v$ is selected from the group consisting of alkyl radicals of 16 or 18 carbon atoms, $-CH_2C_6H_5$, $-CH_2CH_2OH$, $-CH_2OH$, and $-(CH_2)_xNH-$ $C(O)R^{vi}$, wherein x has a value of from 2 to 10 and $R^{vi}$ is a perfluoroalkyl radical having from 1 to 12 carbon atoms; and
X is chloride, bromide, fluoride, iodide, acetate or tosylate.

11. The method of claim 10 wherein the organosilane is 3-(trimethoxysilyl)propyl dimethyloctadecyl ammonium chloride.

12. The method of claim 10 in which the organosilane is present in an amount sufficient to provide a hydrophilic particulate.

13. The method of claim 10 in which the organosilane is present in an amount sufficient to provide a hydrophobic particulate.

14. The method of claim 12 wherein the weight ratio of the organosilane to the particulate material is between 0.1 to less than 0.25.

15. The method of claim 13 wherein the weight ratio of the organosilane to the particulate material is at least 0.25.

16. The method of claim 10 wherein $R^v$ is an alkyl radical of sixteen carbon atoms.

17. The method of claim 10 wherein $R^v$ is an alkyl radical of eighteen carbon atoms.

* * * * *